(12) United States Patent
Zhou et al.

(10) Patent No.: US 9,288,139 B2
(45) Date of Patent: Mar. 15, 2016

(54) METHODS FOR SELECTION OF LINK AGGREGATION CAPABLE ACCESS POINTS

(71) Applicant: QUALCOMM Incorporated, San Diego, CA (US)

(72) Inventors: Yan Zhou, San Diego, CA (US); George Cherian, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 14/243,838

(22) Filed: Apr. 2, 2014

(65) Prior Publication Data
US 2015/0288599 A1 Oct. 8, 2015

(51) Int. Cl.
| | |
|---|---|
| H04W 4/00 | (2009.01) |
| H04L 12/28 | (2006.01) |
| H04L 12/891 | (2013.01) |
| H04L 12/709 | (2013.01) |
| H04L 12/721 | (2013.01) |
| H04W 48/20 | (2009.01) |
| H04W 48/12 | (2009.01) |
| H04W 76/02 | (2009.01) |
| H04W 88/06 | (2009.01) |

(52) U.S. Cl.
CPC .............. *H04L 45/245* (2013.01); *H04L 45/70* (2013.01); *H04W 48/20* (2013.01); *H04W 48/12* (2013.01); *H04W 76/025* (2013.01); *H04W 88/06* (2013.01)

(58) Field of Classification Search
CPC ... H04L 41/0803; H04L 45/245; H04L 47/41; H04L 45/70; H04L 12/709; H04L 12/721; H04W 4/06; H04W 24/02; H04W 28/20; H04W 48/18; H04W 48/20; H04W 72/02; H04W 76/02; H04W 92/02; H04W 48/12; H04W 76/025; H04W 88/06
USPC ......... 370/229–238, 252, 310–350, 431–465, 370/400–410; 709/220–244, 250
See application file for complete search history.

(56) References Cited

U.S. PATENT DOCUMENTS

| | | | |
|---|---|---|---|
| 6,501,749 B1 | 12/2002 | Alexander, Jr. et al. | |
| 6,853,622 B2 | 2/2005 | Wils et al. | |
| 8,089,965 B2 * | 1/2012 | Mitsumori | H04L 45/245 370/219 |
| 8,369,332 B2 | 2/2013 | Kotalwar et al. | |

(Continued)

FOREIGN PATENT DOCUMENTS

EP 2528391 A1 11/2012

OTHER PUBLICATIONS

International Search Report and Written Opinion—PCT/US2015/023264—ISA/EPO—Jul. 9, 2015.

*Primary Examiner* — Tri H Phan
(74) *Attorney, Agent, or Firm* — Arent Fox LLP

(57) ABSTRACT

A method, an apparatus, and a computer program product for wireless communication are provided. In one aspect, an apparatus includes a processor configured to identify at least one interface (e.g., AP interface) configured to support link aggregation, identify one or more groups of the at least one interface, wherein all interfaces of a respective group are configured to be aggregated together, identify supported link aggregation types per group, select one of the groups to support communication via link aggregation, select at least one interface of the selected group, and send information to the selected at least one interface to initialize link aggregation.

24 Claims, 6 Drawing Sheets

(56) References Cited

U.S. PATENT DOCUMENTS

| | | | | |
|---|---|---|---|---|
| 8,406,804 B2* | 3/2013 | Ishizu | H04W 48/20 | 370/332 |
| 8,514,701 B2* | 8/2013 | Kalla | H04W 28/20 | 370/221 |
| 8,675,503 B2* | 3/2014 | Ishizu | H04W 48/18 | 370/248 |
| 9,137,641 B2* | 9/2015 | Kojima | H04W 4/06 | |
| 2003/0223450 A1 | 12/2003 | Bender et al. | | |
| 2006/0098573 A1* | 5/2006 | Beer | H04L 12/2856 | 370/230 |
| 2010/0135214 A1* | 6/2010 | Ishizu | H04W 48/18 | 370/328 |
| 2011/0044339 A1* | 2/2011 | Kotalwar | H04L 45/00 | 370/392 |
| 2011/0064080 A1 | 3/2011 | Hsu et al. | | |
| 2013/0083661 A1 | 4/2013 | Gupta et al. | | |
| 2013/0242843 A1* | 9/2013 | Kojima | H04W 4/06 | 370/312 |
| 2013/0336166 A1 | 12/2013 | Swain et al. | | |
| 2013/0336317 A1 | 12/2013 | Mithyantha et al. | | |
| 2014/0029527 A1 | 1/2014 | Okuda | | |
| 2014/0177690 A1* | 6/2014 | Kochetkov | H04W 84/12 | 375/222 |
| 2014/0376370 A1* | 12/2014 | Cioffi | H04L 45/245 | 370/230 |
| 2015/0003465 A1* | 1/2015 | Saavedra | H04L 41/0816 | 370/401 |
| 2015/0244580 A1* | 8/2015 | Saavedra | H04L 41/0816 | 709/221 |

* cited by examiner

METHODS FOR SELECTION OF LINK AGGREGATION CAPABLE ACCESS POINTS

BACKGROUND

1. Field

The present disclosure relates generally to communication systems, and more particularly, to selecting access points (APs) capable of link aggregation.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved narrowband channel selection for devices in a wireless network.

One aspect of this disclosure provides an apparatus for wireless communication including a processing system. The processing system is configured to identify at least one interface (e.g., AP interface) configured to support link aggregation, identify one or more groups of the at least one interface, wherein all interfaces of a respective group are configured to be aggregated together, select one of the groups to support communication via link aggregation, select at least one interface of the selected group, and send information to the selected at least one interface to initialize link aggregation.

Another aspect of this disclosure provides a method of wireless communication at an apparatus including identifying at least one interface (e.g., AP interface) configured to support link aggregation, identifying one or more groups of the at least one interface, wherein all interfaces of a respective group are configured to be aggregated together, selecting one of the groups to support communication via link aggregation, selecting at least one interface of the selected group, and sending information to the selected at least one interface to initialize link aggregation.

One aspect of this disclosure provides an apparatus for wireless communication including means for identifying at least one interface (e.g., AP interface) configured to support link aggregation, means for identifying one or more groups of the at least one interface, wherein all interfaces of a respective group are configured to be aggregated together, means for selecting one of the groups to support communication via link aggregation, means for selecting at least one interface of the selected group, and means for sending information to the selected at least one interface to initialize link aggregation.

Another aspect of this disclosure provides a computer program product for wireless communications at an apparatus, the computer program product comprising a computer-readable medium having instructions executable to identify at least one interface (e.g., AP interface) configured to support link aggregation, identify one or more groups of the at least one interface, wherein all interfaces of a respective group are configured to be aggregated together, select one of the groups to support communication via link aggregation, select at least one interface of the selected group, and send information to the selected at least one interface to initialize link aggregation.

A further aspect of this disclosure provides a station for wireless communication including at least one antenna and a processing system. The processing system is configured to identify via the at least one antenna at least one interface (e.g. AP interface) configured to support link aggregation, identify via the at least one antenna one or more groups of the at least one interface, wherein all interfaces of a respective group are configured to be aggregated together, select one of the groups to support communication via link aggregation, select at least one interface of the selected group, and send information via the at least one antenna to the selected at least one interface to initialize link aggregation.

DETAILED DESCRIPTION

Figure 1:
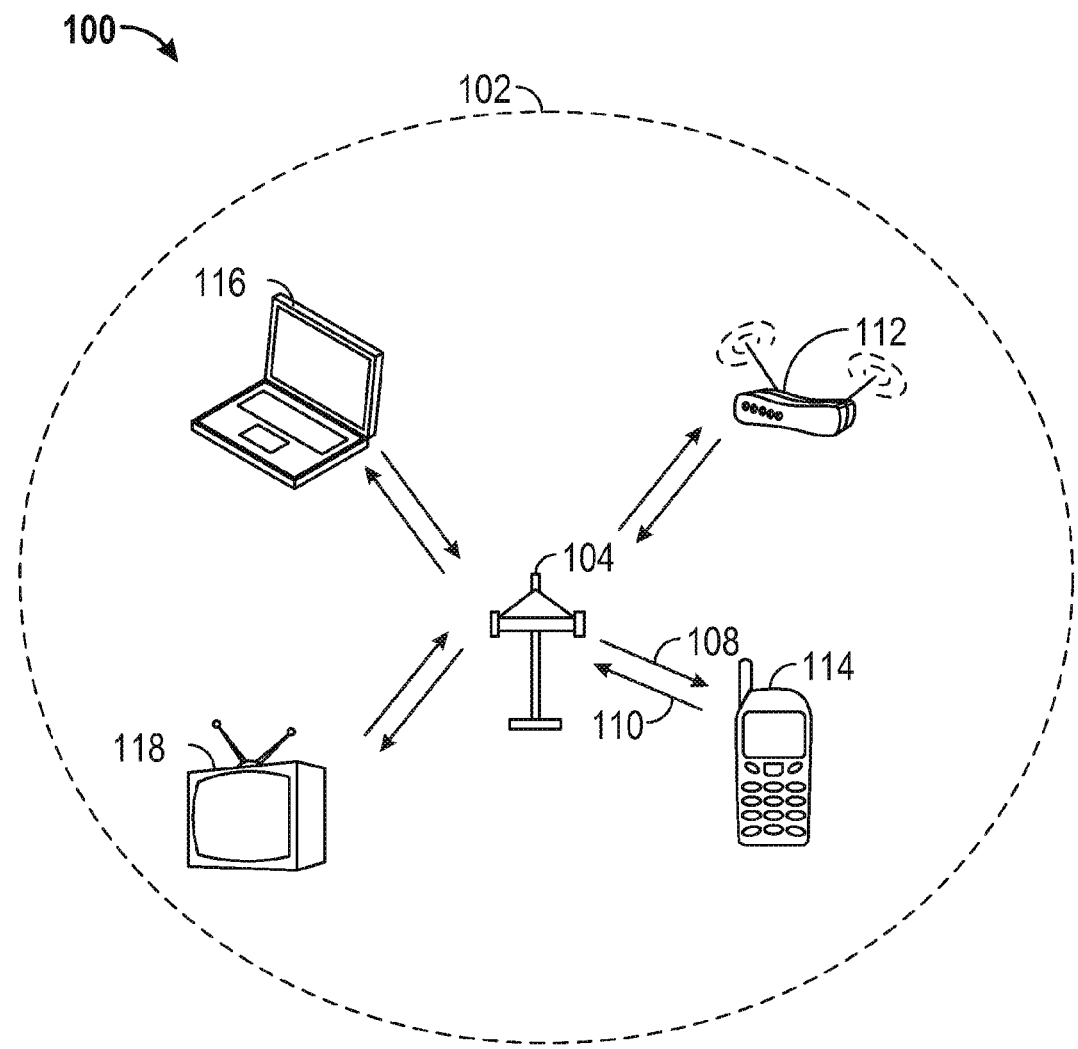
FIG. 1 shows an example wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, connection point, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatus may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, terminology that recites at least one of a combination of elements (e.g., "at least one of A, B, or C") refers to one or more of the recited elements (e.g., A, or B, or C, or any combination thereof).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. The AP 104 along with the STAs associated with the AP 104 and that use the AP 104 for communication may be referred to as a basic service set (BSS). It should be noted that the wireless communication system 100 may not have a central AP 104, but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g., shared) amongst several devices, and information specific to a given device.

In some aspects, a STA (e.g., STA 116) may be required to associate with the AP 104 in order to send communications to and/or receive communications from the AP 104. In one aspect, information for associating is included in a beacon broadcast by the AP 104. To receive such a beacon, the STA 116 may, for example, perform a broad coverage search over a coverage region. A search may also be performed by the STA 116 by sweeping a coverage region in a lighthouse fashion, for example. After receiving the information for associating, the STA 116 may transmit a reference signal, such as an association probe or request, to the AP 104. In some aspects, the AP 104 may use backhaul services, for example, to communicate with a larger network, such as the Internet or a public switched telephone network (PSTN).

Figure 2:
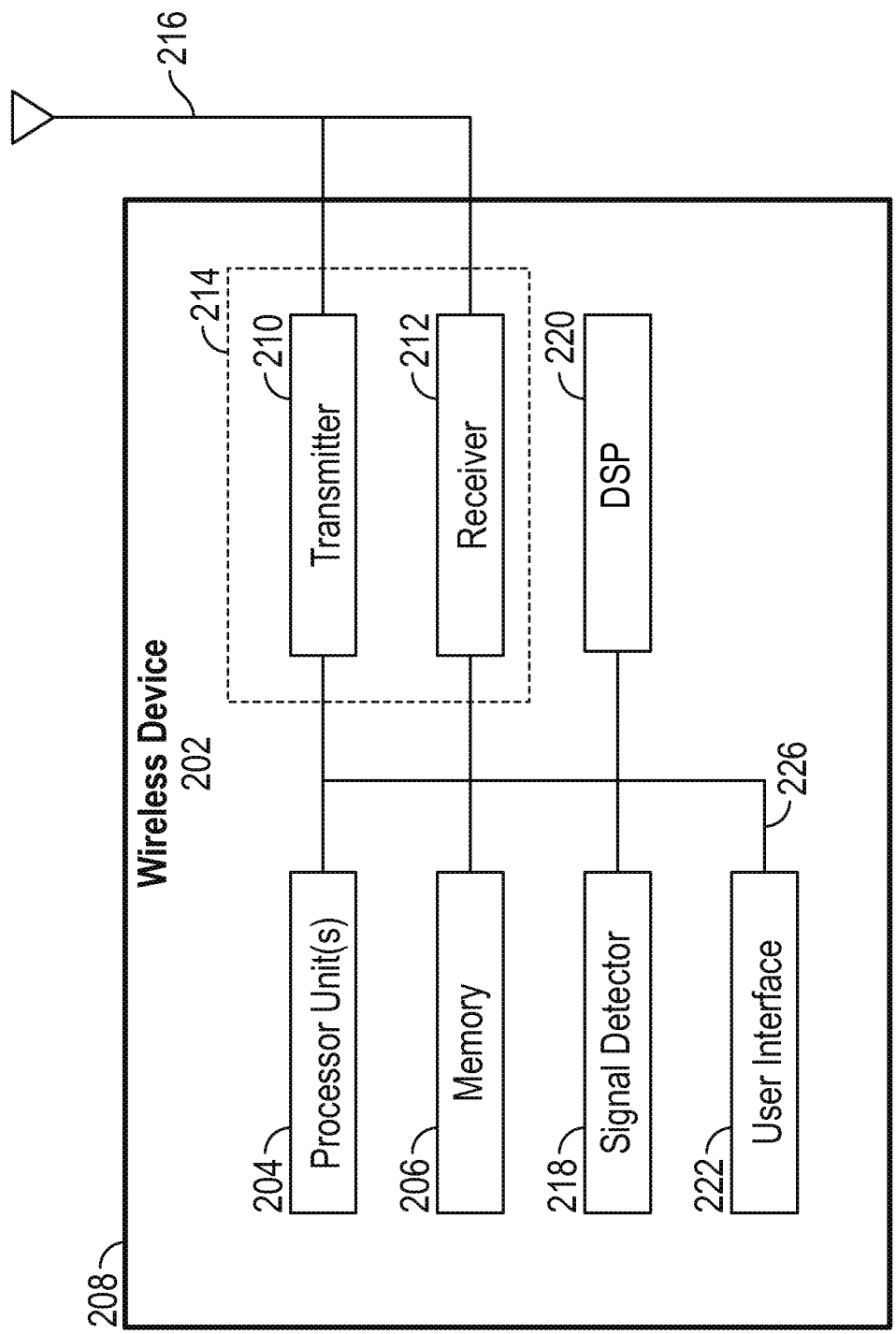
FIG. 2 shows a functional block diagram of an example wireless device that may be employed within the wireless communication system of FIG. 1.

FIG. 2 shows an example functional block diagram of a wireless device 202 that may be employed within the wireless communication system 100 of FIG. 1. The wireless device 202 is an example of a device that may be configured to implement the various methods described herein. For example, the wireless device 202 may comprise the AP 104 or one of the STAs 112, 114, 116, and 118.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

Figure 3:
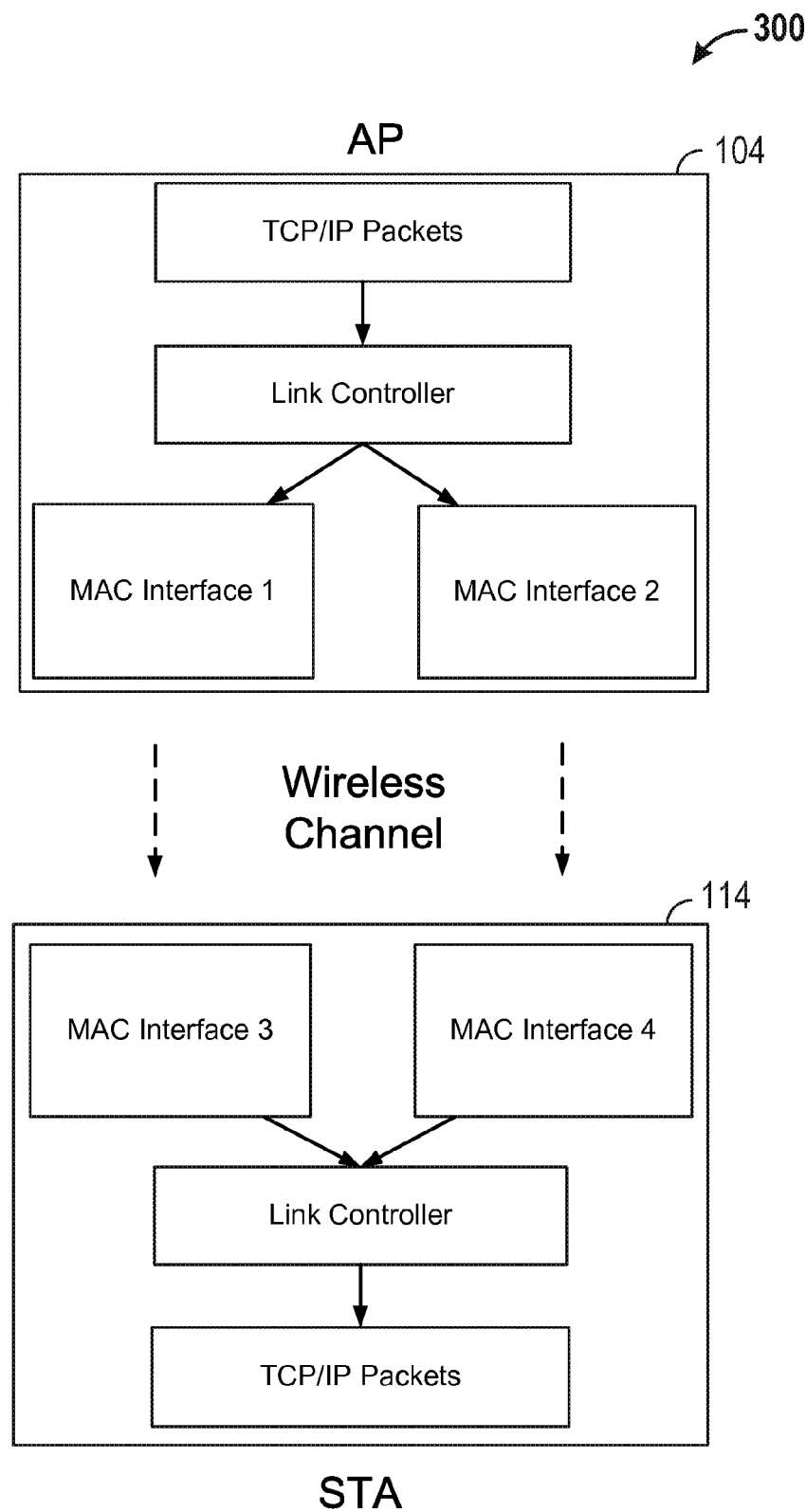
FIG. 3 is a diagram illustrating an example of link aggregation.

FIG. 3 is a diagram 300 illustrating an example of link aggregation. Referring to FIG. 3, both an AP (e.g., AP 104) and a STA (e.g., STA 114) may have multiple medium access control (MAC) interfaces. For example, each of the AP and STA may have a MAC interface for operating on a 2 GHz band and a MAC interface for operating on a 5 GHz band. When the links on different bands between the AP 104 and the STA 114 are aggregated, a Transmission Control Protocol (TCP) or Internet Protocol (IP) flow may be distributed via all interfaces. At the AP 104, TCP/IP packets may be distributed to different interfaces (e.g., MAC interface 1 and MAC interface 2) via a link controller (LC). At the STA 114, TCP/IP packets received from different interfaces (e.g., MAC interface 3 and MAC interface 4) may be reassembled and delivered by a link controller to a TCP/IP layer.

There may be several types of link aggregation, such as flow level aggregation, packet level aggregation, and tunneled direct link setup (TDLS)-based aggregation, for example. In flow level aggregation, the link controller may dynamically choose an interface to send a TCP/IP flow. For example, for a downlink transmission, the link controller of the AP 104 may choose to send a TCP/IP flow via MAC interface 1 of the AP 104 to MAC interface 3 of the STA 114. Alternatively, the link controller of the AP 104 may choose to send the TCP/IP flow via MAC interface 2 of the AP 104 to MAC interface 4 of the STA 114.

In packet level aggregation, the link controller uses all interfaces to send an IP flow. For example, for a downlink transmission, the link controller of the AP 104 sends a TCP/IP flow via MAC interface 1 of the AP 104 to MAC interface 3 of the STA 114, and via MAC interface 2 of the AP 104 to MAC interface 4 of the STA 114.

In an aspect, dual band dual concurrent (DBDC) operation allows for the STA 114 to achieve higher throughput by simultaneously operating on the 2 GHz band and the 5 GHz band. Referring to FIG. 3, in an implementation, a first link (Link 1) between the STA 114 and the AP 104 may be created by associating the STA 114 with the AP 104 on one band (e.g., 2 GHz band) and a set of interfaces (e.g., MAC interface 1 of the AP 104 and MAC interface 3 of the STA 114. A second link (Link 2) may then be created between the STA 114 and the AP 104 on another band (e.g., 5 GHz band) and another set of interfaces (e.g., MAC interface 2 of the AP 104 and MAC interface 4 of the STA 114) by creating an off-channel TDLS link between the STA 114 and a virtual STA included within the AP 104. In an aspect, the virtual STA 306 may be first associated with the AP 104. After successful association, the virtual STA may initiate a TDLS link to the STA 114. The AP 104 and the virtual STA may have different MAC addresses. In FIG. 3, the MAC interface 2 may represent a MAC interface for the virtual STA. Accordingly, in TDLS-based aggregation, the link controller may send downlink flows via a TDLS channel interface (e.g., MAC interface 2 of the AP 104 to MAC interface 4 of the STA 114), while receiving uplink flows via a regular (non-TDLS) channel interface of the AP 104 (e.g. MAC interface 3 of the STA 114 to MAC interface 1 of the AP 104).

Figure 4:
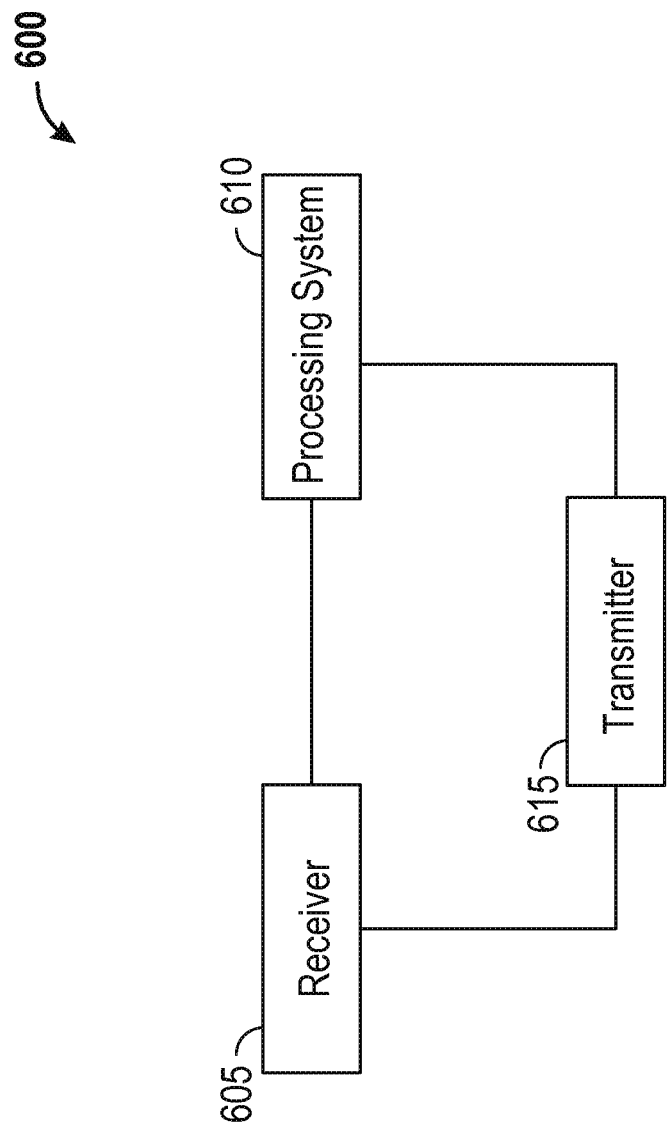
FIG. 4 is a diagram of an example of a STA observing multiple AP MAC interfaces.

FIG. 4 is a diagram 400 of an example of a STA observing multiple AP MAC interfaces. Referring to FIG. 4, the STA 114 includes a MAC interface operating on a 2 GHz band and a MAC interface operating on a 5 GHz band. The STA 114 may have link aggregation capability and observes multiple AP MAC interfaces. For example, the STA 114 may observe a first MAC interface (MAC1) operating on a 2 GHz band, a second MAC interface (MAC2) operating on a 5 GHz band, a third MAC interface (MAC3) operating on a 2 GHz band, a fourth MAC interface (MAC4) operating on a 5 GHz band, a fifth MAC interface (MAC5) operating on a 2 GHz band, and a sixth MAC interface (MAC6) operating on a 5 GHz band. In the example, MAC1 and MAC2 may support link aggregation via a first link controller (LC1). Moreover, MAC3 and MAC4 may support link aggregation via a second link controller (LC2). Generally, each AP MAC interface may be identified by a basic service set identifier (BSSID) included in an AP broadcast. However, if the BSSID is the only information available in the AP broadcast, the STA 114 may not be able to determine which set of AP interfaces can be aggregated (e.g., MAC1 /MAC2 or MAC3 /MAC4) and what types of link aggregation are supported to estimate an aggregated throughput. Thus, a method and apparatus is provided to allow the STA 114 to identify AP interfaces supporting link aggregation and select a set of AP interfaces from the identified AP interfaces to maximize the aggregated throughput.

In an aspect, the AP may broadcast its own link aggregation information to aid the STA in selecting AP interfaces that support link aggregation. For example, each AP interface may broadcast in a beacon/probe response an indicator indicating support of link aggregation. Based on the indicator, the STA can quickly identify link aggregation capable APs and request more detailed information.

Each AP interface may also broadcast an associated link controller (LC) identifier (ID). Based on the LC ID, the STA can identify a group of AP interfaces managed by the same link controller. In an aspect, the LC ID may be a MAC address of one of the managed AP interfaces. As such, no ID conflict would exist among multiple link controllers. In another aspect, the LC ID may be a random number/string configured by the LC itself after deployment, or configured by a manufacturer.

Each AP interface may further broadcast the types of link aggregation supported. Based on this information, the STA can estimate an aggregated throughput based on type. The supported link aggregation types may include flow level aggregation, packet level aggregation, and TDLS-based aggregation, for example.

Based on the different types of link aggregation information broadcasted by the AP, the STA may estimate the aggregated throughput for each set of AP interfaces sharing the same link controller. The STA may then select the set of AP interfaces with the best aggregated throughput.

In a further aspect, the AP may also broadcast neighbor APs' link aggregation information to aid the STA in selecting the AP interfaces supporting link aggregation and reduce the STA's scanning effort. For example, in a broadcasted neighbor list, each AP interface may indicate link aggregation information for each neighbor AP interface. The broadcasted link aggregation information may include an indicator indicating support of link aggregation, an associated LC ID, and the types of link aggregation supported, for example.

In an aspect, an AP interface may collect link aggregation information for neighbor AP interfaces by requesting an associated STA to report each observed neighbor AP interface's link aggregation information broadcasted in a respective AP interface's beacons/probe responses. The AP interface may also directly listen for a neighbor AP interface's link aggregation information broadcasted in beacons/probe responses. The AP interface may further collect the link aggregation information by facilitating a STA to report a previously-associated AP interface's link aggregation information to a currently associating AP interface in the STA's probe/association requests.

In an aspect, neighbor AP interfaces may exchange link aggregation information via backhaul. As such, the AP interface may obtain neighbor AP interface link aggregation information by using the backhaul to directly receive the information from the neighbor AP interface. The AP interface can identify neighbor AP interfaces via a STA report. The AP interface may further determine a neighbor AP's IP address and set up an IP connection accordingly.

In an aspect, the AP interface may obtain neighbor AP interface link aggregation information from a network server. For example, the AP interface may check the network server for the presence of neighbor AP interfaces and obtain the link aggregation information of the neighbor AP interfaces. The AP interface may also report its own link aggregation information, as well as its location, to the network server.

Based on the link aggregation information included in the neighbor list, the STA may estimate an aggregated throughput for each set of AP interfaces sharing the same link controller. The STA may perform the estimation and select a set of AP interfaces having a highest aggregated throughput either periodically or whenever a current received signal strength indicator (RSSI)/throughput falls below a threshold. To reduce an estimation effort, the STA may exclude a set of AP interfaces from the estimation if a number of AP interfaces in the set above a threshold have a high load or low available backhaul. Whether an AP interface has the high load or low available backhaul may be indicated in the neighbor list.

In an aspect, AP interfaces sharing the same link controller may be co-located. Thus, co-located neighbor AP link aggregation information may be broadcasted. One AP interface may be selected as a primary AP interface, e.g., the MAC interface operating on a 2 GHz band. Link aggregation information of other AP interfaces can be broadcasted from the primary AP interface. The STA can estimate the aggregated throughput based on the link aggregation information from the primary AP interface. An RSSI from other AP interfaces can be estimated based on the RSSI from the primary AP interface with a correction based on transmission (Tx) power and frequency difference.

In a further aspect, after selecting a set of AP interfaces sharing the same link controller, the STA may provide a selected AP with the STA's link aggregation information to aid link aggregation setup. The STA's link aggregation information may include, for example, an indicator indicating support multi-interface simultaneous transmission and reception. The presence of the indicator is useful in TDLS-based link aggregation. For example, a virtual STA at an AP will initiate TDLS-based link aggregation when informed that the STA is capable of multi-interface simultaneous transmission and reception.

The STA's link aggregation information may further include the STA's capability per link interface. The presence of this information allows each AP interface to determine a transmission/reception format based on the STA's capability. The STA's capability may include, for example, a supported bandwidth and a modulation and coding scheme (MCS) set.

The STA's link aggregation information may include the types of link aggregation supported by the STA. The AP may choose one of a number of supported types as a final type of link aggregation. The STA's link aggregation information may also include the STA's preferred types of link aggregation. The STA may indicate the preferred type of link aggregation based on which AP will determine the final type and inform the STA. The final type of link aggregation may be different from the preferred type of link aggregation. For example, if the AP uses TDLS-based aggregation for existing legacy STAs, the AP may prefer to use the TDLS-based aggregation for future STAs to maintain isolation between downlink and uplink traffic (data transmissions). In an aspect, the preferred type of link aggregation may be chosen as the type supported by both the STA and AP that provides a highest aggregated throughput.

A procedure for a STA to select AP interfaces in the presence of link aggregation capable APs with previously introduced AP broadcast information will now be discussed. When selecting a set of AP interfaces, the STA may consider, for example, an average packet latency, a packet error rate, an aggregated throughput, and/or a link aggregation type of the set of AP interfaces. Referring to FIG. 4, in an aspect, a STA 114 may estimate an aggregated throughput for AP interfaces sharing the same link controller, e.g., MAC1 and MAC2 sharing LC1. The STA 114 may then select a best set of AP interfaces based on the estimated throughput. AP interfaces that are incapable of aggregation (e.g., MAC5 and MAC6) may be jointly considered.

In an example, the STA 114 may estimate the aggregated throughput for each set of AP interfaces sharing the same link controller (identified from an AP broadcast) according to three steps. At step 1, the STA 114 may estimate an over-the-air (OTA) throughput per AP interface. For each AP interface, the STA estimates the OTA throughput (Interface_OTA_Thrp) as a function of RSSI and load (see Equation (1) below) where RSSI/load can be measured/read from an AP broadcast.

$$\text{Interface\_OTA\_Thrp} = f(\text{RSSI, Load}) \qquad \text{Equation (1)}$$

At step 2, the STA 114 may estimate an aggregated OTA throughput for the set of AP interfaces sharing the same link controller. The estimation may be based on a link aggregation type. For a packet level aggregation type (identified from an AP broadcast), the aggregated OTA throughput (Aggre_OTA_Thrp) is equal to a sum of the OTA throughputs (Interface_OTA_Thrp) across all AP interfaces since each traffic flow can use all AP interfaces. See Equation (2) below.

$$\text{Aggre\_OTA\_Thrp} = \text{Sum of Interface\_OTA\_Thrp across all AP interfaces} \qquad \text{Equation (2)}$$

For a flow level aggregation type, an aggregated OTA throughput (Aggre_OTA_Thrp) is equal to a sum of a top N highest OTA throughput (top N InterfaceOTA_Thrp) across all AP interfaces. See Equation (3) below.

$$\text{Aggre\_OTA\_Thrp} = \text{Sum of top } N \text{ Interface\_OTA\_Thrp across all AP interfaces} \qquad \text{Equation (3)}$$

N may be equal to a minimum of a number of interfaces and the STA's number of flows, since each flow may use one AP interface. If the STA's number of flows is less than or equal to the number of interfaces, then N is equal to the number of flows and the top N interfaces with a highest OTA throughput can be used to transmit the flows. Otherwise, N is equal to the number of interfaces and all N interfaces will be shared by all flows.

For a TDLS-based aggregation type, an aggregated OTA throughput may depend on the STA's downlink and uplink flow type. If the STA only has uplink flows, then the aggregated throughput may be equal to the OTA throughput on an AP regular operating (non-TDLS) channel, on which uplink flows will be transmitted. If the STA only has downlink flows, then the aggregated throughput may be equal to the OTA throughput on a TDLS off channel, on which downlink flows will be transmitted. If the STA has both downlink flows and uplink flows, then the aggregated throughput may be equal to the OTA throughput on both an AP regular operating channel and a TDLS off channel.

At step 3, the STA 114 may estimate an achievable aggregated throughput (Achievable_Aggre_Thrp) by considering a backhaul limit or available backhaul throughput (Avail_BH_Thrp). For example, the STA may estimate the achievable aggregated throughput for the set of AP interfaces sharing the same link controller according to Equation (4) below. The aggregated OTA throughput (Aggre_OTA_Thrp) may be based on aggregation type. The available backhaul throughput (Avail_BH_Thrp) may be read from an existing AP broadcast.

$$\text{Achievable Aggre\_Thrp} = \min(\text{Aggre\_OTA\_Thrp}, \text{Avail\_BH Thrp}) \qquad \text{Equation (4)}$$

In an aspect, the STA 114 may select AP interfaces based on an estimated aggregated throughput according to three steps. At step 1, among all link aggregation capable AP interfaces, the STA may determine a best set of AP interfaces sharing a same link controller and providing a highest estimated achievable aggregated throughput. At step 2, among all link aggregation incapable AP interfaces, the STA may determine a best set of AP interfaces providing a highest estimated achievable aggregated throughput. For step 2, the estimation may be similar to that for flow level aggregation since each flow may only use one AP interface.

At step 3, the STA may compare the throughputs of the best sets of AP interfaces determined at steps 1 and 2 in order to select one of the sets. The STA may select a best set of AP interfaces incapable of link aggregation if a corresponding throughput is sufficiently better than a best set of AP interfaces capable of link aggregation. In an aspect, for a same initially estimated throughput, the STA may prefer the best set of AP interfaces capable of link aggregation, which can dynamically manage flows based on link conditions, and hence may provide better actual throughput in the long term. Otherwise, the STA will select the best set of AP interfaces incapable of link aggregation, if an estimated throughput exceeds that of the best set of AP interfaces capable of link aggregation beyond a threshold.

Figure 5:
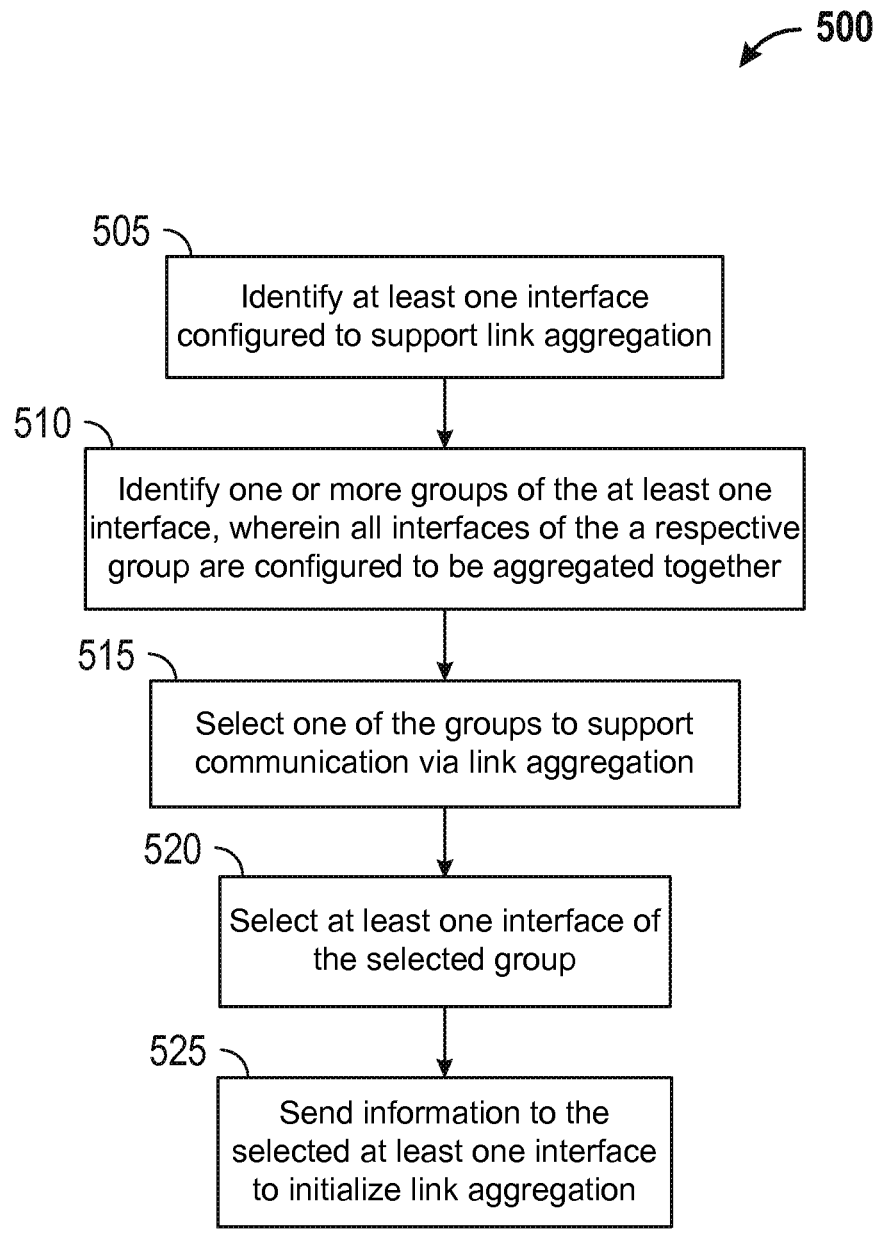
FIG. 5 is a flowchart of an example method of wireless communication.

FIG. 5 is a flowchart of an example method 500 of wireless communication. The method 500 may be performed using an apparatus (e.g., the wireless device 202 of FIG. 2, for example). The apparatus may be implemented as a STA 112, 114, 116, or 118, for example. Although the process 500 is described below with respect to the elements of wireless device 202 of FIG. 2, other components may be used to implement one or more of the steps described herein.

At block 505, the apparatus may identify at least one interface (e.g., AP interface) configured to support link aggregation. In an aspect, at block 505, the apparatus may receive information from at least one interface of the apparatus and identify the at least one interface (AP interface) configured to support link aggregation based on the information. Receiving the information and identifying the at least one interface may be performed by the processor 204 and/or the receiver 212, for example.

In an aspect, the information may include an indicator indicating support of link aggregation, an identification of a link controller associated with one of the groups, and/or a supported link aggregation type. The supported link aggregation type may be, for example, flow level aggregation, packet level aggregation, and/or tunneled direct link setup (TDLS)-based aggregation. In a further aspect, the information received from the at least one interface may be associated with the at least one interface (e.g., AP interface) or an interface neighboring the at least one interface (e.g., neighbor AP interface).

At block 510, the apparatus may identify one or more groups of the at least one interface, wherein all interfaces of a respective group are configured to be aggregated together. Identifying the one or more groups may be performed by the processor 204 and/or the receiver 212, for example.

At block 515, the apparatus may select one of the groups to support communication via link aggregation. In an aspect, at block 515, the apparatus may determine a parameter for at least one of the groups and select one of the groups based on the parameter. Determining the parameter and selecting one of the groups may be performed by the processor 204 and/or the receiver 212, for example. In an aspect, when selecting one of the groups, the parameter may include an average packet latency, a packet error rate, and/or an aggregated throughput.

In an aspect, the parameter may comprise the aggregated throughput. Accordingly, the apparatus may determine the parameter for a group by determining an over-the-air throughput of each link in the group based on a measured signal strength of each link and a load broadcasted on each link, determining an over-the-air aggregated throughput based on the over-the-air throughput of each link and a link aggregation type supported by the group, and determining the aggregated throughput by limiting the over-the-air aggregated throughput based on an available backhaul speed at which any link of the group broadcasts a signal. In a further aspect, the supported link aggregation type may be a packet level aggregation. Accordingly, the over-the-air aggregated throughput may be based on the over-the-air throughputs of all links in the group.

At block 520, the apparatus may select at least one interface (e.g., AP interface) of the selected group. At block 525, the apparatus may send information to the selected at least one interface to initialize link aggregation. Selecting the at least one interface and sending the information may be performed by the processor 204 and/or the transmitter 210, for example. In an aspect, the information may include an indicator indicating support of communication via multiple interfaces, a capability associated with the at least one interface (AP interface) or the interface neighboring the at least one interface (neighbor AP interface), a supported link aggregation type, and/or a preferred link aggregation type.

Figure 6:
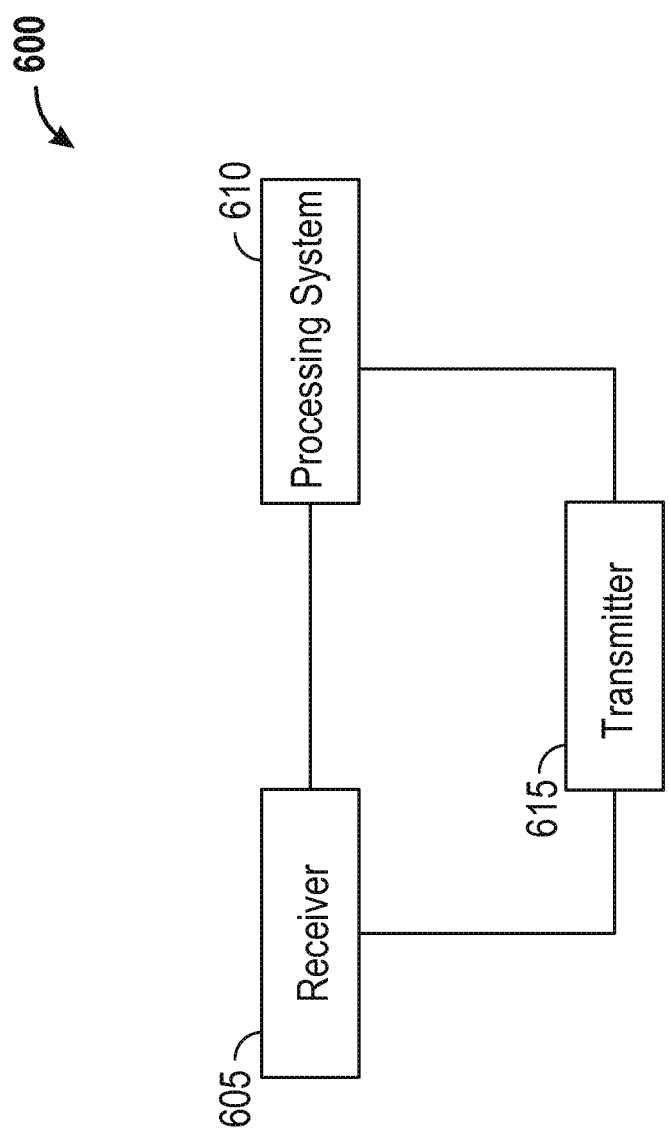
FIG. 6 is a functional block diagram of an example wireless communication device.

FIG. 6 is a functional block diagram of an example wireless communication device 600. The wireless communication device 600 may include a receiver 605, a processing system 610, and a transmitter 615. The processing system 610 and/or the receiver 605 may be configured to identify at least one interface (e.g., AP interface) configured to support link aggregation. In an aspect, the processing system 610 and/or the receiver 605 receives information from at least one interface of the apparatus and identifies the at least one interface (AP interface) configured to support link aggregation based on the information. The processing system 610 and/or the receiver 605 may further be configured to identify one or more groups of the at least one interface, wherein all interfaces of a respective group are configured to be aggregated together. The processing system 610 and/or the receiver 605 may also further be configured to select one of the groups to support communication via link aggregation. In an aspect, the processing system 610 and/or the receiver 605 determines a parameter for at least one of the groups and selects one of the groups based on the parameter. The processing system 610 and/or the transmitter 615 may be configured to select at least one interface (e.g., AP interface) of the selected group and send information to the selected at least one interface to initialize link aggregation. The receiver 605, the processing system 610, and/or the transmitter 615 may be configured to perform one or more functions discussed above with respect to blocks 505, 510, 515, 520, and 525 of FIG. 5. The receiver 605 may correspond to the receiver 212. The processing system 610 may correspond to the processor 204. The transmitter 615 may correspond to the transmitter 210.

Moreover, means for identifying at least one interface configured to support link aggregation, means for identifying one or more groups of the at least one interface, wherein all interfaces of a respective group are configured to be aggregated together, and means for selecting one of the groups to support communication via link aggregation may comprise the processing system 610 and/or the receiver 605. Means for selecting at least one interface of the selected group and means for sending information to the selected at least one interface to initialize link aggregation may comprise the processing system 610 and/or the transmitter 615.

As used herein, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), unless the element is expressly recited using the phrase "means for" or, in the case of a method claim, the element is recited using the phrase "step for."

What is claimed is:

1. An apparatus for wireless communication, comprising:
   a processing system configured to:
   identify at least one interface of a plurality of interfaces at a second apparatus configured to support link aggregation;
   identify one or more groups of interfaces associated with the at least one interface, wherein all interfaces of a respective group of interfaces are configured to be aggregated together; and
   select one of the groups to support communication via link aggregation.

2. The apparatus of claim 1, wherein the processing system is configured to select by:
   determining a parameter for at least one of the groups; and
   selecting one of the groups based on the parameter.

3. The apparatus of claim 2, wherein the parameter comprises at least one of:
   an average packet latency;
   a packet error rate; or
   an aggregated throughput.

4. The apparatus of claim 3, wherein if the parameter comprises the aggregated throughput, the parameter for a group is determined by:
   determining an over-the-air throughput of each link in the group based on a measured signal strength of each link and a load broadcasted on each link;
   determining an over-the-air aggregated throughput based on the over-the-air throughput of each link and a link aggregation type supported by the group; and
   determining the aggregated throughput by limiting the over-the-air aggregated throughput based on an available backhaul speed at which any link of the group broadcasts a signal.

5. The apparatus of claim 4, wherein if the supported link aggregation type is a packet level aggregation, the over-the-air aggregated throughput is based on the over-the-air throughputs of all links in the group.

6. The apparatus of claim 1, wherein the processing system is further configured to:
   receive information from one or more interfaces, wherein the at least one interface configured to support link aggregation is identified based on the received information from the one or more interfaces.

7. The apparatus of claim 6, wherein the information comprises at least one of:
   an indicator indicating support of link aggregation;
   an identification of a link controller associated with one of the groups; or
   a supported link aggregation type.

8. The apparatus of claim 7, wherein the supported link aggregation type comprises at least one of:
   flow level aggregation;
   packet level aggregation; or
   tunneled direct link setup (TDLS)-based aggregation.

9. The apparatus of claim 6, wherein the information received from the one or more interfaces is associated with the one or more interfaces or an interface neighboring the one or more interfaces.

10. The apparatus of claim 1, wherein the processing system is further configured to:
    select a set of interfaces of the selected group; and
    send information to the selected set of interfaces to initialize link aggregation.

11. The apparatus of claim 10, wherein the information comprises at least one of:
    an indicator indicating support of communication via multiple interfaces;
    a capability associated with the selected set of interfaces or an interface neighboring the selected set of interfaces;
    a supported link aggregation type; or
    a preferred link aggregation type.

12. A method of wireless communication, comprising:
    identifying at least one interface of a plurality of interfaces at a second apparatus configured to support link aggregation;
    identifying one or more groups interfaces associated with of the at least one interface, wherein all interfaces of a respective group of interfaces are configured to be aggregated together; and
    selecting one of the groups to support communication via link aggregation.

13. The method of claim 12, wherein the selecting comprises:
    determining a parameter for at least one of the groups; and
    selecting one of the groups based on the parameter.

14. The method of claim 13, wherein the parameter comprises at least one of:
    an average packet latency;
    a packet error rate; or
    an aggregated throughput.

15. The method of claim 14, wherein if the parameter comprises the aggregated throughput, the parameter for a group is determined by:
    determining an over-the-air throughput of each link in the group based on a measured signal strength of each link and a load broadcasted on each link;

determining an over-the-air aggregated throughput based on the over-the-air throughput of each link and a link aggregation type supported by the group; and determining the aggregated throughput by limiting the over-the-air aggregated throughput based on an available backhaul speed at which any link of the group broadcasts a signal.

16. The method of claim 15, wherein if the supported link aggregation type is a packet level aggregation, the over-the-air aggregated throughput is based on the over-the-air throughputs of all links in the group.

17. The method of claim 12, further comprising:
receiving information from one or more interfaces, wherein the at least one interface configured to support link aggregation is identified based on the received information from the one or more interfaces.

18. The method of claim 17, wherein the information comprises at least one of:
an indicator indicating support of link aggregation;
an identification of a link controller associated with one of the groups; or
a supported link aggregation type.

19. The method of claim 18, wherein the supported link aggregation type comprises at least one of:
flow level aggregation;
packet level aggregation; or
tunneled direct link setup (TDLS)-based aggregation.

20. The method of claim 17, wherein the information received from the one or more interfaces is associated with the one or more interfaces or an interface neighboring the one or more interfaces.

21. The method of claim 12, further comprising:
selecting a set of interfaces of the selected group; and
sending information to the selected set of interfaces to initialize link aggregation.

22. The method of claim 21, wherein the information comprises at least one of:
an indicator indicating support of communication via multiple interfaces;
a capability associated with the selected set of interfaces or an interface neighboring the selected set of interfaces;
a supported link aggregation type; or
a preferred link aggregation type.

23. A computer-readable medium storing computer executable code for wireless communication by an apparatus, comprising code for:
identifying at least one interface of a plurality of interfaces at a second apparatus configured to support link aggregation;
identify one or more groups of interfaces associated with the at least one interface, wherein all interfaces of a respective group of interfaces are configured to be aggregated together; and
select one of the groups to support communication via link aggregation.

24. A station for wireless communication, comprising:
at least one antenna; and
a processing system configured to:
identify, via the at least one antenna, at least one interface of a plurality of interfaces at a second apparatus configured to support link aggregation,
identify, via the at least one antenna, one or more groups of interfaces associated with the at least one interface, wherein all interfaces of a respective group of interfaces are configured to be aggregated together; and
select one of the groups to support communication via link aggregation.

\* \* \* \* \*